(12) United States Patent
Yang et al.

(10) Patent No.: US 11,989,891 B2
(45) Date of Patent: May 21, 2024

(54) SYSTEM AND METHOD FOR 3D MULTI-OBJECT TRACKING IN LIDAR POINT CLOUDS

(71) Applicant: Beijing Qingzhouzhihang Technology Co., LTD., Beijing (CN)

(72) Inventors: Xiaodong Yang, Beijing (CN); Chenxu Luo, Beijing (CN)

(73) Assignee: Beijing Qingzhouzhihang Technology Co., LTD., Beijing (CN)

( * ) Notice: Subject to any disclaimer, the term of this patent is extended or adjusted under 35 U.S.C. 154(b) by 412 days.

(21) Appl. No.: 17/395,626

(22) Filed: Aug. 6, 2021

(65) Prior Publication Data
US 2023/0043061 A1    Feb. 9, 2023

(51) Int. Cl.
G06T 7/246    (2017.01)
G01S 17/89    (2020.01)
G06V 20/56    (2022.01)

(52) U.S. Cl.
CPC .............. G06T 7/248 (2017.01); G01S 17/89 (2013.01); G06V 20/56 (2022.01); *G06T 2207/10028* (2013.01); *G06T 2207/20081* (2013.01)

(58) Field of Classification Search
None
See application file for complete search history.

(56) References Cited

U.S. PATENT DOCUMENTS

| 11,227,398 B2 * | 1/2022 | Xiao | G06T 7/579 |
| 11,315,317 B2 * | 4/2022 | Yu | G01S 17/931 |
| 11,465,642 B2 * | 10/2022 | Xiao | G01S 17/89 |
| 11,468,690 B2 * | 10/2022 | Yuan | G06V 10/763 |
| 11,608,078 B2 * | 3/2023 | He | G01C 21/3815 |
| 2023/0043061 A1 * | 2/2023 | Yang | G01S 17/931 |

OTHER PUBLICATIONS

Cross-Modal Localization: Using automotive radar for absolute geolocation within a map produced with visible-light imagery. Iannucci et al. (Year: 2020).*

* cited by examiner

*Primary Examiner* — Delomia L Gilliard
(74) *Attorney, Agent, or Firm* — Harness, Dickey & Pierce, P.L.C.

(57) ABSTRACT

A method and a device for multi-object tracking, and an electronic device are provided. The method includes: determining a hybrid-time position map of a current point cloud fragment; converting a tracked position map of a previous point cloud fragment into a temporary tracked position map of the current point cloud fragment; and averaging the hybrid-time position map and the temporary tracked position map of the current point cloud fragment, to generate a tracked position map of the current point cloud fragment. With the method and the device for multi-object tracking, and the electronic device, the hybrid-time position map and temporary tracked position map of the current point cloud fragment are averaged, so that not only the tracked position map of the current point cloud fragment is accurately generated, but also an object ID is inherited. Based on the object ID, the same object in different point cloud fragments are associated, so that multi-object tracking is implemented without an association step in the conventional solutions. It is unnecessary to set additional hyper-parameters, and strong versatility is achieved.

20 Claims, 5 Drawing Sheets

SYSTEM AND METHOD FOR 3D MULTI-OBJECT TRACKING IN LIDAR POINT CLOUDS

FIELD

The present disclosure relates to the technical field of object tracking, and in particular to a method and a device for 3D multi-object tracking, an electronic device, and a computer-readable storage medium.

BACKGROUND

Tracking based on LiDAR has attracted increasing interests in recent years in both academia and industry with the rapid development of self-driving vehicles. 3D multi-object tracking in LiDAR point clouds is a key ingredient in autonomous driving.

Most of existing methods for multi-object tracking follow the tracking-by-detection pipeline, which is also known as tracking after detection. These methods first detect an object in each frame, and then associate detection sets over time, that is, match the objects detected in different frames through an association step to achieve object tracking. Most existing work focuses on better defining an affinity matrix required for the association step, resulting in an increasingly complex association step, which is difficult to apply to autonomous driving scenarios.

SUMMARY

A method and a device for multi-object tracking, an electronic device, and a computer-readable storage medium are provided according to the present disclosure in order to solve the technical problems that processing in the existing solutions for object tracking is complex.

In a first aspect, a method for multi-object tracking is provided according to an embodiment of the present disclosure. The method includes: determining a hybrid-time position map of a current point cloud fragment, where the hybrid-time position map represents a first appearance position of a valid object in the current point cloud fragment, and the valid object is an object other than a dead object in the current point cloud fragment; converting a tracked position map of a previous point cloud fragment into a temporary tracked position map of the current point cloud fragment based on a predicted motion field and an ego-motion of a local device, where the previous point cloud fragment is a point cloud fragment before the current point cloud fragment, part of point cloud data of the previous point cloud fragment is the same as that of the current point cloud fragment, and the tracked position map includes position information and an object identity of each object; and averaging the hybrid-time position map and the temporary tracked position map of the current point cloud fragment, to generate a tracked position map of the current point cloud fragment, where the tracked position map of the current point cloud fragment inherits an object identity in the tracked position map of the previous point cloud fragment.

In an embodiment, the determining a hybrid-time position map of a current point cloud fragment includes: converting the current point cloud fragment into the hybrid-time position map based on a predetermined backbone network, where the hybrid-time position map includes confidence of the first appearance position of the valid object in the current point cloud fragment, and the position information in the tracked position map represents confidence of the object at a corresponding position.

In an embodiment, before the determining a hybrid-time position map of a current point cloud fragment, the method further includes: generating multiple sample point cloud fragments based on multiple continuous point cloud data, where each of the multiple sample point cloud fragments has the same part of point cloud data as other sample point cloud fragment adjacent to the sample point cloud fragment; for each of the multiple sample point cloud fragments: determining a first appearance position of each valid object in the sample point cloud fragment, and generating a sample hybrid-time position map including the first appearance position of each valid object in the sample point cloud fragment; and training the backbone network based on the multiple sample point cloud fragments and the multiple sample hybrid-time position maps.

In an embodiment, the method further includes: determining the motion field based on the backbone network, where the motion field represents motion parameters of an object in the current point cloud fragment.

In an embodiment, the method further includes: generating an object identity and adding the generated object identity to a new born object when the new born object shows up in the tracked position map of the current point cloud fragment.

In an embodiment, the converting a tracked position map of a previous point cloud fragment into a temporary tracked position map of the current point cloud fragment based on a predicted motion field and an ego-motion of a local device includes: updating the position information of each object in the tracked position map of the previous point cloud fragment based on a motion field of the previous point cloud fragment, to generate a first tracked position map, and updating the position information of each object in the first tracked position map based on the ego-motion corresponding to the current point cloud fragment, to generate the temporary tracked position map; or updating the position information of each object in the tracked position map of the previous point cloud fragment based on one of the motion field and the ego-motion corresponding to the current point cloud fragment to generate a second tracked position map, and updating the position information of each object in the second tracked position map based on the other of the motion field and the ego-motion corresponding to the current point cloud fragment, to generate the temporary tracked position map.

In an embodiment, the method further includes: performing multi-object tracking based on the tracked position map of the current point cloud fragment; or performing multi-object tracking based on the first tracked position map or the second tracked position map.

In an embodiment, the averaging the hybrid-time position map and the temporary tracked position map of the current point cloud fragment, to generate a tracked position map of the current point cloud fragment includes: performing averaging processing on the hybrid-time position map and the temporary tracked position map of the current point cloud fragment, performing non-maximum suppression processing on a result of the averaging processing, to generate the tracked position map of the current point cloud fragment.

In an embodiment, the first appearance position of the valid object is a first appearance position of a center of the valid object, and the position information of an object is position information of a center of the object.

In an embodiment, point cloud data of a last frame of the previous point cloud fragment is the same as point cloud data of a first frame of the current point cloud fragment.

In a second aspect, a device for multi-object tracking is provided according to an embodiment of the present disclosure. The device includes a hybrid-time position map determination module, a motion conversion module and a tracked position map determination module. The hybrid-time position map determination module is configured to determine a hybrid-time position map of a current point cloud fragment. The hybrid-time position map represents a first appearance position of a valid object in the current point cloud fragment. The valid object is an object in the current point cloud fragment other than a dead object. The motion conversion module is configured to convert a tracked position map of a previous point cloud fragment into a temporary tracked position map of the current point cloud fragment based on a predicted motion field and ego-motion of the local device. The previous point cloud fragment is a point cloud fragment before the current point cloud fragment. Part of the point cloud data of the previous point cloud fragment is the same as that of the current point cloud fragment. The tracked position map includes position information and an object identity of each object. The tracked position map determination module is configured to average the hybrid-time position map and the temporary tracked position map of the current point cloud fragment, to generate a tracked position map of the current point cloud fragment. The tracked position map of the current point cloud fragment inherits the object identities in the tracked position map of the previous point cloud fragment.

In a third aspect, an electronic device is provided according to an embodiment of the present disclosure. The electronic device includes a bus, a transceiver, a memory, a processor, and a computer program stored in the memory and is configured to be executed by the processor. The transceiver, the memory and the processor are connected to each other via the bus. The computer program, when executed by the processor, implements steps of the method for multi-object tracking according to any one of the above embodiments.

In a fourth aspect, a computer-readable storage medium is further provided according to an embodiment of the present disclosure. The computer-readable storage medium stores a computer program which, when executed by a processor, implements steps of the method for multi-object tracking according to any one of the above embodiments.

With the method and the device for multi-object tracking, the electronic device and the computer-readable storage medium according to embodiments of the present disclosure, the hybrid-time position map and temporary tracked position map of the current point cloud fragment are averaged, so that not only the tracked position map of the current point cloud fragment is accurately generated, but also an object ID is inherited. Based on the object ID, the same object in different point cloud fragments are associated, so that multi-object tracking is implemented without an association step in the conventional solutions. The hybrid-time position map shows only the first appearance position of the valid object, and a temporarily occluded object is tracked normally, without setting additional hyper-parameters. Therefore, the technical solutions for multi-object tracking according to the embodiments of the present disclosure have stronger versatility.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below.

DETAILED DESCRIPTION OF EMBODIMENTS

The existing technical solutions for object tracking inevitably require a heuristic matching step for detection association, that is, an association step. The association step usually involves hand-crafted engineering rules. For example, tracking based on Kalman filter is sensitive to the choice of covariance matrix. Choosing distance metrics and maximum distance threshold allowed for each specific object class also greatly affects the final performance. In addition, the objects involved in object tracking mainly include tracked objects, new born objects, and dead objects. The existing technical solutions for object tracking require hyper-parameters to manage the new born objects and the dead objects. The hyper-parameters include, for example, keeping the maximum number of frames of the dead tracks, and initializing the minimum number of frames before the newborn objects. Such rules and hyper-parameters are usually related to data sets and models, so that the existing technical solutions for object tracking are less versatile when applied to new scenarios.

Figure 1:
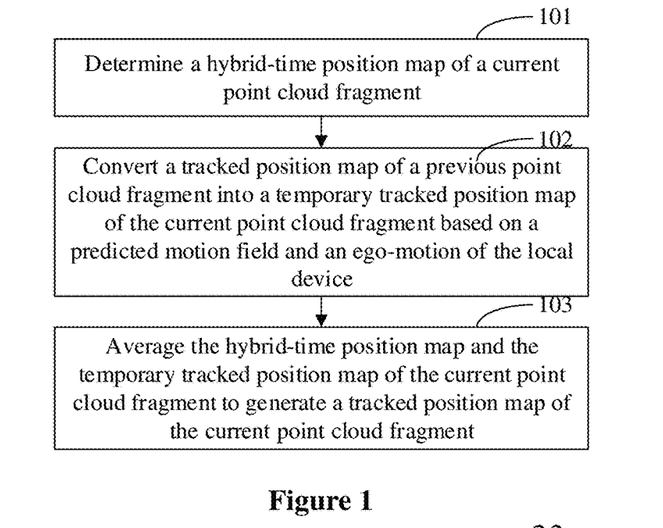
FIG. 1 is a flowchart of a method for multi-object tracking according to an embodiment of the present disclosure.

A method for multi-object tracking is provided according to an embodiment of the present disclosure, and is totally heuristic-free. That is, the method for multi-object tracking according to the embodiment of the present disclosure involves no association step, and multi-object tracking is implemented. FIG. 1 is a flowchart of the method for multi-object tracking according to the embodiment of the present disclosure. This method is capable of tracking multiple objects around a local device. As shown in FIG. 1, the method includes steps 101 to 103.

In step 101, a hybrid-time position map of a current point cloud fragment is determined. The hybrid-time position map represents a first appearance position of a valid object in the current point cloud fragment. The valid object is an object other than a dead object in the current point cloud fragment.

Figure 2:
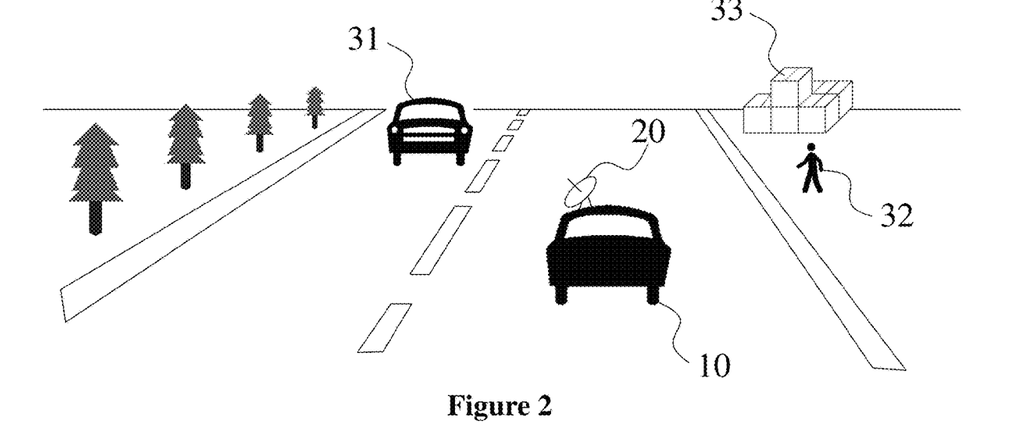
FIG. 2 is a schematic diagram showing an application scenario of the method for multi-object tracking according to the embodiment of the present disclosure.

In the embodiment of the present disclosure, the local device refers to a device that needs to track other object around it. As shown in FIG. 2, the local device 10 may be, for example, a vehicle in an autonomous driving scene, or a processing device in the vehicle. In general, the local device 10 may be a subject that performs the method for multi-object tracking. The local device 10 is equipped with a LiDAR 20 capable of collecting surrounding point cloud data. Based on the LiDAR 20, multiple frames of point cloud data are collected, so that multiple pieces of consecutive point cloud data are selected in sequence to form a point cloud fragment. That is, a point cloud fragment includes multiple consecutive point cloud data within a certain period of time. For example, the point cloud fragment includes point cloud data of a $(t-1)^{th}$ frame and the point cloud data of a $t^{th}$ frame. Alternatively, the point cloud fragment includes point cloud data of a $(t-1)^{th}$ frame, point cloud data of a $t^{th}$ frame, and point cloud data of a $(t+1)^{th}$ frame. The current point cloud fragment refers to a point cloud fragment that needs to be processed currently. FIG. 2 shows a schematic structure of the LiDAR 20 and is not used to limit the shape and/or form of the LiDAR 20; the LiDAR 20 can collect point cloud data of other objects around the local device 10, such as collecting the point cloud data of objects, such as other vehicles 31, pedestrians 32 and buildings 33, etc.

In addition, the concept of the hybrid-time position map is introduced in the embodiment of the present disclosure. A hybrid-time position map of a point cloud fragment is generated based on at least two frames or all of the point cloud data in the point cloud fragment. Specifically, the hybrid-time position map represents a first appearance position of each valid object in a point cloud fragment. The valid object is an object in the point cloud fragment other than a dead object. That is, valid objects include tracked objects and new born objects. The tracked object refers to an object that always shows up in the point cloud fragment. The new born object refers to an object that does not show up in the beginning of the point cloud fragment but shows up in the end of the point cloud fragment. The dead object refers to an object that shows up in the beginning of the point cloud fragment but does not show up in the end of the point cloud fragment. Correspondingly, the hybrid-time position map of the current point cloud fragment represents the first appearance position of the valid object in the current point cloud fragment. For example, the current point cloud fragment includes point cloud data of a $(t-1)^{th}$ frame, point cloud data of a $t^{th}$ frame, and point cloud data of a $(t+1)^{th}$ frame. If an object A always shows up, the object A is a tracked object, and a first appearance position of the object A is a position of the object A in the $(t-1)^{th}$ frame. If an object B shows up in only the $(t-1)^{th}$ frame and the $t^{th}$ frame, that is, the object B does not show up in the $(t+1)^{th}$ frame, the object B is a dead object. If an object C shows up in only the $(t+1)^{th}$ frame, there is a high probability that the object C is newly generated in the $(t+1)^{th}$ frame. That is, the object C does not show up before the $(t+1)^{th}$ frame, and the object C is a new born object. A first appearance position of the object C is a position of the object C in the $(t+1)^{th}$ frame.

In an embodiment, a position of an object is represented by a center of the object. That is, a first appearance position of a valid object is a first appearance position of a center of the valid object. In this case, the hybrid-time position map represents the first appearance position of the center of the valid object in the current point cloud fragment. The hybrid-time position map may also be referred to as a hybrid-time centerness map.

In step 102, a tracked position map of a previous point cloud fragment is converted into a temporary tracked position map of the current point cloud fragment based on a predicted motion field and an ego-motion of the local device. The previous point cloud fragment is a point cloud fragment before the current point cloud fragment. Part of the point cloud data of the previous point cloud fragment is the same as that of the current point cloud fragment. The tracked position map includes position information and an object identity of each object.

In the embodiment of the present disclosure, there are other point cloud fragments before the current point cloud fragment, that is, the previous point cloud fragment. In addition, the previous point cloud fragment has the same partial point cloud data as the current point cloud fragment. That is, the point cloud data of the same frame shows up in both the previous point cloud fragment and the current point cloud fragment. The previous point cloud fragment and the current point cloud fragment partially overlap in time. For example, the current point cloud fragment includes point cloud data of a $(t-1)^{th}$ frame, point cloud data of a $t^{th}$ frame, and point cloud data of a $(t+1)^{th}$ frame. The previous point cloud fragment includes point cloud data of a $(t-2)^{th}$ frame, the point cloud data of the $(t-1)^{th}$ frame, and the point cloud data of the $t^{th}$ frame. The previous point cloud fragment and the current point cloud fragment both include the point cloud data of the $(t-1)^{th}$ frame and the point cloud data of the $t^{th}$ frame. In general, the number of frames included in a point cloud fragment is equal to the number of frames included in another point cloud fragment. For example, the previous point cloud fragment and the current point cloud fragment both include point cloud data of 3 frames. Moreover, for full use of all point cloud data and better timeliness, only point cloud data of a last frame in the current point cloud fragment is not included in the previous point cloud fragment. For example, each point cloud fragment include two frames. That is, one point cloud fragment includes point cloud data of a $(t-1)^{th}$ frame and point cloud data of the $t^{th}$ frame, a next point cloud fragment includes point cloud data of a $t^{th}$ frame and point cloud data of a $(t+1)^{th}$ frame, and so on. In this way, collected point cloud data can be processed in time. In an embodiment, the point cloud data of only one frame of the previous point cloud fragment and the current point cloud fragment are the same. That is, point cloud data of the last frame of the previous point cloud fragment is the same as point cloud data of the first frame of the current point cloud fragment. Generally, a point cloud fragment includes point cloud data of two frames. The first frame of the current point cloud fragment is the same as the last frame of the previous point cloud fragment.

In the embodiment of the present disclosure, a tracked position map is determined for each point cloud fragment, so that multi-object tracking is implemented based on the tracked position map. Specifically, the tracked position map includes position information of each object around the local device. The position information indicates a position of the object. Alternatively, the position information indicates confidence of the object at a position. For example, if it is determined that an object always in one position, the confidence of the object at the position is 1. In addition, each object in the tracked position map is provided with an identity (ID), that is, an object identity or an object ID, so as to facilitate distinguishing of different objects and facilitate subsequent tracking based on the object ID. Optionally, the tracked position map can be displayed in a user interface (e.g. user interface 1160 shown in FIG. 6), in order to be output to the user of the user interface.

The tracked position map of the previous point cloud fragment is used in determination of the tracked position map of the current point cloud fragment. Specifically, the ego-motion of the local device is determined based on motion parameters of the local device. For example, the local device is a vehicle. A speed and a direction of the vehicle are determined based on a sensor on the vehicle. When the local device stops, the ego-motion of the local device is zero. Moreover, in the embodiment of the present disclosure, motion parameters of each object are also predicted so as to form a motion field. That is, the motion field represents motion parameters of other object around the local device, such as a moving speed and a moving direction of the object. As described above, the tracked position map of the previous point cloud fragment represents the position information of each object in the previous point cloud fragment. Therefore, the position information of each object is updated by combining the predicted motion field and the ego-motion of the local device, to acquire possible position information of the object in the current point cloud fragment, so as to form the tracked position map in the current point cloud fragment. In the embodiment of the present disclosure, the tracked position map acquired in this case is referred to as a temporary tracked position map.

In an embodiment, in the case that the center of the object is used to indicate the position of the object, the above-mentioned tracked position map is referred to as a tracked centerness map. The position information in the tracked position map represents position information of a center of a corresponding object. In addition, an initial tracked position map may be obtained from an initial hybrid-time centerness map. For example, the initial hybrid-time centerness map is directly used as the initial tracked position map. Alternatively, non-maximum suppression (NMS) processing is performed on the initial hybrid-time centerness map to generate the initial tracked position map.

In step 103, the hybrid-time position map and the temporary tracked position map of the current point cloud fragment are averaged to generate a tracked position map of the current point cloud fragment. The tracked position map of the current point cloud fragment inherits the object identities in the tracked position map of the previous point cloud fragment.

In the embodiment of the present disclosure, the tracked position map of the previous point cloud fragment includes an object identity, so that the temporary tracked position map converted from the tracked position map of the previous point cloud fragment also includes the object identity. Averaging processing is performed in the above step 103, to determine the object identity in the tracked position map of the current point cloud fragment based on the object identity in the temporary tracked position map, so that the tracked position map inherits the object identity.

The temporary tracked position map is obtained based on the motion parameters of the local device and the motion parameters of the object. The temporary tracked position map represents the position information of each object in the current point cloud fragment. The hybrid-time position map of the current point cloud fragment represents the first appearance position of each valid object in the current point cloud fragment. Therefore, the hybrid-time position map also represents the position information of each valid object. In addition, the hybrid-time position map represents the first appearance position of the valid object. The first appearance position of the tracked object is the position of tracked object in the first frame of the current point cloud fragment. The previous point cloud fragment and the current point cloud fragment partially overlap in time, that is, the previous point cloud fragment also includes the first frame of the current point cloud fragment. The temporary tracked position map obtained by updating the tracked position map of the previous point cloud fragment represents the position of the object in the first frame of the current point cloud fragment to a certain extent. Therefore, the hybrid-time position map and the temporary tracked position map of the current point cloud fragment have the same meaning. In an ideal situation, the tracked object has exactly the same position information in the hybrid-time position map and the temporary tracked position map. Therefore, by averaging the hybrid-time position map and the temporary tracked position map, the position information of each object is determined accurately, thereby generating the tracked position map of the current point cloud fragment.

In addition, although the hybrid-time position map includes no object ID, the temporary tracked position map includes the object ID of each object since the temporary tracked position map is obtained by updating the tracked position map of the previous point cloud fragment. The tracked position map of the current point cloud fragment generated after the averaging process inherits the object ID in the temporary tracked position map. That is, the tracked position map of the current point cloud fragment inherits the object ID in the tracked position map of the previous point cloud fragment. Therefore, the same object has the same object ID in different tracked position maps, so that object tracking is conveniently implemented based on the object ID.

In addition, a dead object is removed from the hybrid-time position map. Through the above-mentioned averaging processing, the dead object is weakened in the tracked position map of the current point cloud fragment. In the subsequent processing process, the dead object is weakened many times until it is determined that the dead object completely disappears. If an object temporarily disappears because of being occluded, and then the LiDAR 20 collects a point cloud of the object, the object is enhanced through the averaging process, so that the object that temporarily disappears is tracked normally. In order to track the object that temporarily disappears, hyper-parameters such as the maximum number of frames in which the object shows up are manually set in the conventional solutions for object tracking. In the solutions according to the embodiment of the present disclosure, such hyper-parameters are unnecessarily set and debugged, thereby having strong versatility and further avoiding performance degradation due to incorrect hyper-parameter settings.

In an embodiment, after averaging the hybrid-time position map of the current point cloud fragment and the temporary tracked position map, the non-maximum suppression processing is performed on the result of the average processing, to generate a tracked position map of the current point cloud fragment, so as to highlight the position of each object in the tracked position map.

Those skilled in the art should understand that the above-mentioned averaging processing is simple arithmetic averaging processing, or other averaging processing such as weighted averaging processing, which is not limited in this embodiment.

In an embodiment, in a case that a new born object shows up in the tracked position map of the current point cloud fragment, an object identity is generated for the new born object so as to facilitate subsequent tracking of the new born object based on the object identity. It should be noted that, if an object A shows up in the hybrid-time position map of the current point cloud fragment and does not show up in the temporary tracked position map, the object A is a new born object in the tracked position map of the current point cloud fragment. If an object A shows up in both the hybrid-time position map of the current point cloud fragment and the temporary tracked position map, the object A temporarily disappears. The object A is not a new born object in the tracked position map of the current point cloud fragment, that is, the object ID of the object A in the temporary tracked position map is inherited in this case, and a new object ID for the object A is unnecessarily generated.

A hybrid-time position map and a tracked position map are introduced in the method for multi-object tracking according to the embodiment of the present disclosure. By averaging the hybrid-time position map and temporary tracked position map of the current point cloud fragment, not only the tracked position map of the current point cloud fragment is accurately generated, but also the object ID is inherited. Based on the object ID, the same object in different point cloud fragments are associated, so that multi-object tracking is implemented without the association step in the conventional solutions. The hybrid-time position map shows only the first appearance position of the valid object, and the temporarily occluded object is tracked normally, without setting additional hyper-parameters. Therefore, the technical solutions for multi-object tracking according to the embodiments of the present disclosure have stronger versatility.

Based on the above-mentioned embodiments, a hybrid-time position map of each point cloud fragment is determined based on a predetermined backbone network according to an embodiment of the present disclosure. Specifically, the process of "determining a hybrid-time position map of the current point cloud fragment" in step 101 includes: converting the current point cloud fragment into a hybrid-time position map based on a predetermined backbone network. For example, the current point cloud fragment is inputted to the backbone network, to output the hybrid-time position map of the current point cloud fragment. The hybrid-time position map includes confidence of the first appearance position of a valid object in the current point cloud fragment. That is, the first appearance position of the valid object in the hybrid-time position map is represented as confidence. Correspondingly, the position information in the tracked position map represents the confidence of the object at the corresponding position. In the embodiment of the present disclosure, each of the hybrid-time position map and the tracked position map is a Gaussian heatmap, and a numerical value therein represents a degree of confidence. In general, in the hybrid-time position map, the tracked object and the new born object have large confidence, and the dead object has small confidence. In this embodiment, a dead object is determined based on the degree of confidence, and confidence of the dead object is set to zero.

In an embodiment, a training set is set up in advance and a hybrid-time position map of a sample point cloud fragment in the training set, that is, a sample hybrid-time position map, is determined, so as to train the backbone network. The backbone network is trained by performing the following steps A1 to A3.

In step A1, multiple sample point cloud fragments are generated based on multiple continuous point cloud data, where each sample point cloud fragment has the same part of point cloud data as other sample point cloud fragment adjacent to the sample point cloud fragment.

In step A2, for each of the multiple sample point cloud fragments: a first appearance position of each valid object in the sample point cloud fragment is determined, and a sample hybrid-time position map including the first appearance position of each valid object in the sample point cloud fragment is generated.

In step A3, the backbone network is trained based on the multiple sample point cloud fragments and the multiple sample hybrid-time position maps.

In the embodiment of the present disclosure, the sample point cloud fragment is also a kind of point cloud fragment. Each piece of point cloud data in the sample point cloud fragment is marked with a position, for example, a center position, of an object. Therefore, a corresponding sample hybrid-time position map is generated based on the point cloud data in the sample point cloud fragment. The sample hybrid-time position map includes an accurate first appearance position of each valid object. In other words, confidence of the first appearance position of each valid object is 1.

For example, each point cloud fragment includes two frames of point cloud data. It is assumed that the sample point cloud fragment includes point cloud data of a $(t-1)^{th}$ frame and point cloud data of a $t^{th}$ frame, and ground-truth objects are $\{d_i^{t-1}\}_{i=1,\ldots,n_{t-1}}$ and $\{d_j^t\}_{j=1,\ldots,n_t}$ in the point cloud data of the $(t-1)^{th}$ frame and the point cloud data of the $t^{th}$ frame, respectively. If an object $d_i^{t-1}$ in the $(t-1)^{th}$ frame and an object $d_j^t$ in the $t^{th}$ frame are both the same object A, the object A is a tracked object. In the sample hybrid-time position map, a first appearance position of the object A is its position in the $(t-1)^{th}$ frame. If an object B does not show up in the $(t-1)^{th}$ frame but sows up in the $t^{th}$ frame, the object B is a new born object. In the sample hybrid-time position map, a first appearance position of the object B is its position in the $t^{th}$ frame. If an object C shows up in the $(t-1)^{th}$ frame but does not show up in the $t^{th}$ frame, the object C is a dead object. The object C is not represented in the sample hybrid-time position map. The above allocation strategy is performed on all the ground-truth objects in the sample point cloud fragment, to obtain the sample hybrid-time position map of the sample point cloud fragment.

In an embodiment, the backbone network is further used to predict a motion field. For example, the backbone network includes multiple branches, one of which is used to determine the hybrid-time position map, and another branch is used to predict the motion field. For example, the current point cloud fragment is inputted into the backbone network, a motion field that represents the motion parameters of the object in the current point cloud fragment is obtained and based on an output result of a corresponding branch.

In addition, the backbone network may further include a regression branch, to determine a height, a bounding box size, and a heading angle of each object. In the training process, a loss function that determines a branch of the hybrid-time centerness map is represented by focal loss. A loss function of other branch is represented by standard loss. Total loss of the backbone network is acquired from weighting. The loss functions may be acquired in other manners, which are not limited in this embodiment.

In an embodiment, in a process of acquiring the temporary tracked position map by conversion, processing is performed based on the predicted motion field and another processing is performed based on the ego-motion of the local device, so as to obtain a required temporary tracked position map. Specifically, the process of "converting the tracked position map of the previous point cloud fragment into the temporary tracked position map of the current point cloud fragment based on the predicted motion field and the ego-motion of the local device" in step 102 includes the following steps B1 to B2.

In step B1, the position information of each object in the tracked position map of the previous point cloud fragment is updated based on the motion field of the previous point cloud fragment, to generate a first tracked position map.

In step B2, the position information of each object in the first tracked position map is updated based on the ego-motion corresponding to the current point cloud fragment, to generate the temporary tracked position map.

Alternatively, the process of "converting the tracked position map of the previous point cloud fragment into the temporary tracked position map of the current point cloud fragment based on the predicted motion field and the ego-motion of the local device" in step 102 includes the following steps C1 to C2.

In step C1, the position information of each object in the tracked position map of the previous point cloud fragment is updated based on one of the motion field and the ego-motion corresponding to the current point cloud fragment to generate a second tracked position map.

In step C2, the position information of each object in the second tracked position map is updated based on the other of the motion field and the ego-motion corresponding to the current point cloud fragment, to generate the temporary tracked position map.

In the embodiment of the present disclosure, a round of processing is performed for each point cloud fragment. That is, a hybrid-time position map, a motion field, and ego-motion of the local device are determined for the point cloud fragment, so as to determine the temporary tracked position map of the point cloud fragment. As shown in the above steps B1 to B2, the temporary tracked position map is generated based on the motion field of the previous point cloud fragment and the ego-motion corresponding to the current point cloud fragment. Alternatively, as shown in the above steps C1 to C2, the tracked position map of the previous point cloud fragment is converted into the temporary tracked position map based on the motion field and ego-motion of the current point cloud fragment.

For example, a tracked position map of the previous point cloud fragment is $T_{t-1}$, a motion field is of the previous point cloud fragment is $M_{t-1}$, a motion field of the current point cloud fragment is $M_t$, and ego-motion of the local device is $m_t^{ego}$. In the embodiment of the present disclosure, the tracked position map $T_{t-1}$ is updated to form a first tracked position map $T'_{t-1}$ based on the motion field $M_{t-1}$, and the first tracked position map $T'_{t-1}$ is converted into a temporary tracked position map $T''_t$ of the current point cloud fragment based on the ego-motion $m_t^{ego}$ corresponding to the current point cloud fragment. Alternatively, the tracked position map $T_{t-1}$ is converted into a second tracked position map $T'_{t-1}$ based on the motion field $M_t$ of the current point cloud fragment or the ego-motion $m_t^{ego}$, so as to acquire a temporary tracked position map $T''_t$ of the current point cloud fragment.

In addition, the tracked position map in the embodiment of the present disclosure represents position information of each object. Therefore, other objects around the local device are tracked based on the tracked position map, to achieve multi-object tracking. Alternatively, tracking is performed based on the motion field or ego-motion of the local device. For example, multi-object tracking is implemented based on the first tracked position map or the second tracked position map. Moreover, the first or the second tracked position map can optionally also be displayed in the user interface (e.g. user interface 1160 shown in FIG. 6), in order to be output to the user of the user interface.

The process of the method for multi-object tracking is described in detail below based on an embodiment.

Figure 3A:
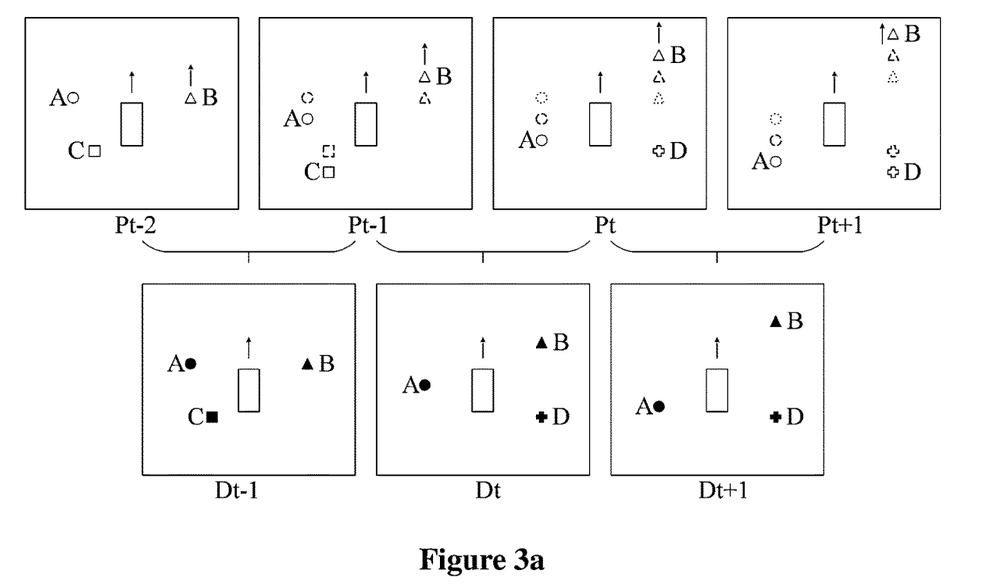
FIG. 3a is a schematic diagram showing generation of a hybrid-time position map in the method for multi-object tracking according to an embodiment of the present disclosure.

In the embodiment of the present disclosure, the point cloud data is voxelized into a regular grid based on a pillar, and a feature of each pillar is extracted, so that point cloud data of each frame is represented in a bird's-eye view (BEV), as shown in FIG. 3a for details. In addition, each point cloud fragment includes point cloud data of two adjacent frames. FIG. 3a shows point cloud data of four frames, namely, point cloud data $P_{t-2}$ of a $(t-2)^{th}$ frame, point cloud data $P_{t-1}$ of a $(t-1)^{th}$ frame, point cloud data $P_t$ of a $t^{th}$ frame, and point cloud data $P_{t+1}$ of a $(t+1)^{th}$ frame. The point cloud data of the four frames form three point cloud fragments, namely, $\{P_{t-2}, P_{t-1}\}$, $\{P_{t-1}, P_t\}$, $\{P_t, P_{t+1}\}$. Hybrid-time position maps $D_{t-1}$, $D_t$, $D_{t+1}$ respectively corresponding to the three point cloud fragments are acquired based on the pre-trained backbone network.

For ease of description, the point cloud data in FIG. 3a only involves a small number of objects, including objects A, B, C, and D. The local device is represented by a rectangular box in the middle of the point cloud data. The local device is moving forward at a constant speed, that is, the ego-motion of the local device remains unchanged. The objects A and B are tracked objects that always exist. The object A is stationary, the object B is also moving forward, and a speed of the object B is greater than the speed of the local device. Both objects C and D are stationary. The object C will disappear in a later frame, that is, a dead object. The object D is a new born object. For convenience of comparison, in a part of the point cloud data in FIG. 3a, a position of an object in the previous frame is represented by a dotted pattern, which does not show up in real point cloud data. For example, in the point cloud data $P_t$, in addition to the position of the object A represented by a solid pattern, the positions of the object A at the $(t-1)^{th}$ frame and the $(t-2)^{th}$ frame are also represented by respective dashed patterns.

In the point cloud fragment $\{P_{t-2}, P_{t-1}\}$, objects A, B, and C are all tracked objects. The hybrid-time position map $D_{t-1}$ corresponding to the point cloud fragment $\{P_{t-2}, P_{t-1}\}$ shows the first appearance positions of the objects A, B and C, that is, the positions of the objects A, B, and C at the $(t-2)^{th}$ frame. It should be noted that the hybrid-time position map in the actual scene is a heatmap. For convenience of description in the embodiment of the present disclosure, the first appearance position of each object is accurately indicated by a dot in the hybrid-time position map. Similarly, the point cloud fragment $\{P_{t-1}, P_t\}$ involves the dead object C and the new born object D. The hybrid-time position map $D_t$ corresponding to the point cloud fragment $\{P_{t-1}, P_t\}$ includes the objects A, B, and D. The first appearance positions of the tracked object A and B are their respective positions in the $(t-1)^{th}$ frame. The first appearance position of the new born object D is its position in the $t^{th}$ frame. In the point cloud fragment $\{P_t, P_{t+1}\}$, the objects A, B, and C are all tracked objects. Therefore, the first appearance positions of the objects A, B, and D in the hybrid-time position map $D_{t+1}$ are their respective positions in the $t^{th}$ frame.

In addition, the temporary tracked position map in this embodiment is acquired by performing the above steps B1 to B2. That is, after the tracked position map $T_{t-1}$ of each point cloud fragment is obtained, a first tracked position map $T'_{t-1}$ is acquired from updating based on the motion field $M_{t-1}$ in this case. In the next point cloud fragment, the first tracked position map $T'_{t-1}$ is converted into a temporary tracked position map $T''_{t-1}$ based on ego-motion $m_t^{ego}$ in the next point cloud fragment, and so on.

Figure 3B:
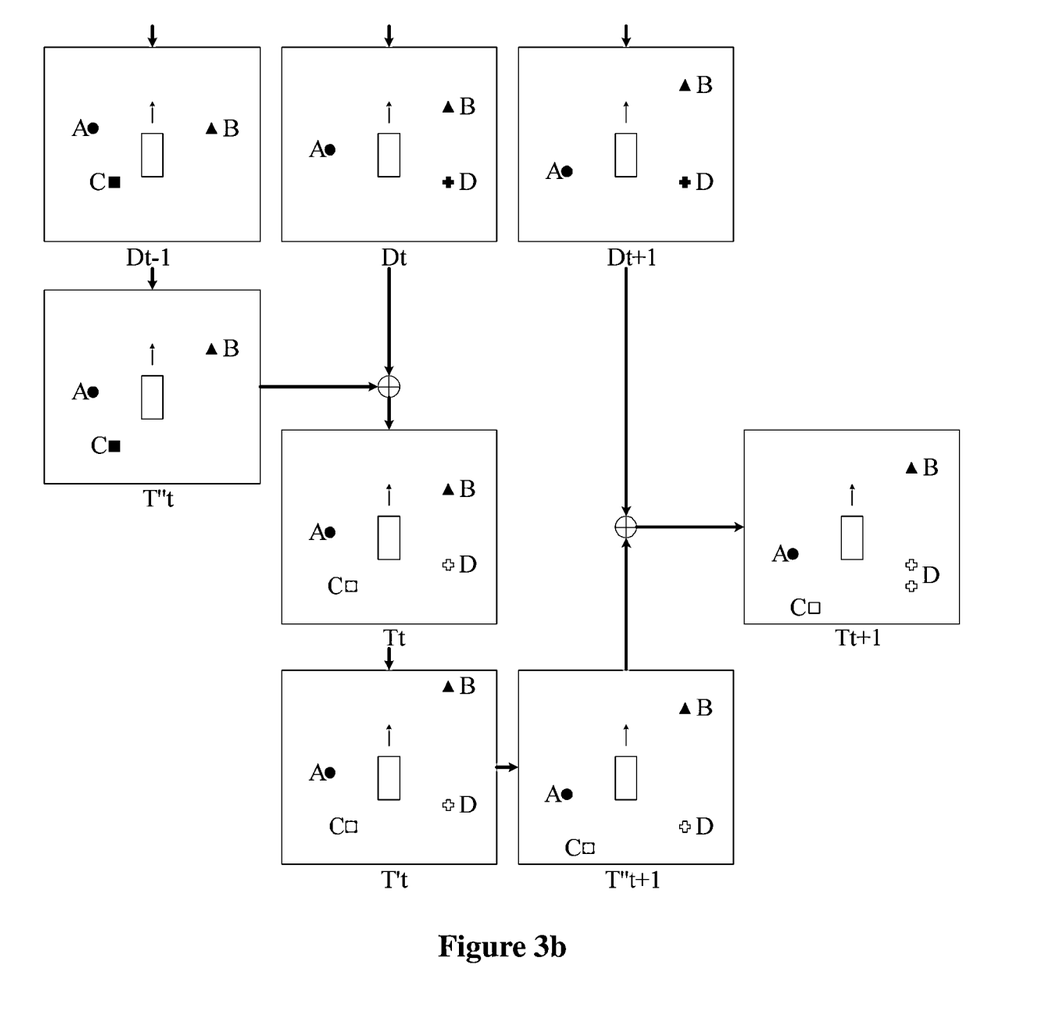
FIG. 3b is a schematic diagram showing an overview of the method for multi-object tracking according to an embodiment of the present disclosure.

FIG. 3b shows a process of generating a tracked position map based on the hybrid-time position map in FIG. 3a.

Specifically, in the point cloud fragment {$P_{t-2}$, $P_{t-1}$}, the tracked position map $T_{t-1}$ of the point cloud fragment is determined based on the hybrid-time position map $D_{t-1}$, so as to acquire the temporary tracked position map $T''_t$ of the point cloud fragment. Since the tracked position map $T_{t-1}$ is acquired based on a previous point cloud fragment {$P_{t-3}$, $P_{t-2}$}, the detailed process of acquiring the temporary tracked position map $T'_t$ is not shown in FIG. 3 in order to simplify description. Instead, FIG. 3b directly shows the temporary tracked position map $T'_t$. In the case that all objects in the point cloud fragment are tracked objects, it can be simply considered that the temporary tracked position map $T''_t$ obtained from updating based on the motion field and ego-motion is substantially the same as the point cloud data $P_{t-1}$ of the last frame in the point cloud fragment. Therefore, the positions of the objects A, B, and C in the point cloud data $P_{t-1}$ are directly used here to indicate their respective positions in the temporary tracked position map $T''_t$.

After the hybrid-time position map $D_t$ of the point cloud fragment {$P_{t-1}$, $P_t$} is determined, the hybrid-time position map $D_t$ and the temporary tracked position map $T''_t$ are averaged to obtain the tracked position map $T_t$ of the point cloud fragment {$P_{t-1}$, $P_t$}. For example, the averaging processing is arithmetic averaging processing, that is, $T_t=(D_t+T''_t)/2$. Since the hybrid-time position map Dt does not include the dead object C but includes the new born object D, the tracked objects A and B still have high confidence after the averaging process (theoretically, the tracked objects A and B in the hybrid-time position map $D_t$ has the same positions as the temporary tracked position map $T''_t$). For example, the tracked objects A and B each have confidence of 1. However, the dead object C and the new born object each ha low confidence, for example, 0.5. FIG. 3b shows confidence of the objects with different gray values.

In addition, the motion field of each point cloud fragment, for example, the motion field $M_t$ of the point cloud fragment {$P_{t-1}$, $P_t$}, is determined based on the backbone network. The motion field $M_t$ represents motion parameters of each valid object in the $(t-1)^{th}$ frame and the $t^{th}$ frame. In this case, both objects A and D are stationary, and the object B is moving forward at a certain speed. The tracked position map $T_t$ is updated to form the first tracked position map $T'_t$ based on the motion field $M_t$, as shown in FIG. 3b.

In the point cloud fragment {$P_t$, $P_{t+1}$}, the hybrid-time position map $D_{t+1}$ and corresponding ego-motion $m_{t+1}^{ego}$ are determined based on the backbone network. The first tracked position map $T'_t$ is updated based on the ego-motion $m_{t+1}^{ego}$, so that the temporary tracked position map $T''_{t+1}$ is determined. In the embodiment of the present disclosure, updating based on ego-motion refers to converting the first tracked position map to a current coordinate system of the current point cloud fragment, thereby generating a temporary tracked position map in the current coordinate system. In this embodiment, the local device is moving forward, and therefore the surrounding objects A, B, C, and D are moving backward, so that the coordinate system is converted. The object C is a dead object, and the position of the object C in the temporary tracked position map $T''_{t+1}$ is updated, or remains the same as that in the first tracked position map $T'_t$, which is not limited in this embodiment.

After that, the hybrid-time position map $D_{t+1}$ and the temporary tracked position map $T''_{t+1}$ are added to obtain the tracked position map $T_{t+1}$. In the tracked position map $T_{t+1}$, the confidence of the object C is further reduced, for example, to 0.25. After multiple iterations, the confidence of the object C approaches zero, indicating that the object C is a dead object. If the object C is temporarily occluded, the confidence of the object C in the tracked position map increases in the subsequent iteration after the object C shows up in the hybrid-time position map, so that the object C can be tracked continuously, and influence of temporary occlusion is reduced.

The tracked position map $T_{t+1}$ indicates the confidence of the new born object D at a certain position. As shown in FIG. 3b, the confidence of the object D at an upper position is 0.5, and the confidence of the object D at a lower position is 0.25. That is, in the tracked position map $T_{t+1}$, the object D is more likely to be in the upper position, which is basically the same as the position of the object D in the point cloud data $P_t$. The non-maximum suppression processing is performed on the result of the average processing, so that the confidence of the position of each object is accurately expressed in the tracked position map.

In summary, as shown in FIG. 3b, the method for multi-object tracking according to the embodiment of the present disclosure includes the following step (1) to step (7).

In step (1), the current point cloud fragment is {$P_{t-1}$, $P_t$}, and the previous point cloud fragment is {$P_{t-2}$, $P_{t-1}$}. In this case, the ego-motion $m_t^{ego}$ of the local device is determined, and the hybrid-time position map $D_t$ and the motion field $M_t$ of the current point cloud fragment are determined based on the backbone network.

In step (2), the temporary tracked position map $T''_t$ is generated.

The tracked position map $T_{t-1}$, which is not shown in FIG. 3b, of the previous point cloud fragment is converted into the temporary tracked position map $T''_t$ based on the ego-motion $m_t^{ego}$ corresponding to the current point cloud fragment and the motion field $M_{t-1}$ of the previous point cloud fragment.

In step (3), the hybrid-time position map $D_t$ and the temporary tracked position map T"t are averaged to obtain the tracked position map $T_t$ of the current point cloud fragment.

In step (4), the tracked position map $T_t$ is updated based on the motion field $M_t$ of the current point cloud fragment, to obtain the first tracked position map $T'_t$.

The above steps (1) to (4) form one iteration, so as to implement multi-object tracking based on the tracked position map $T_t$ or the first tracked position map $T'_t$. Next, next iteration is performed with the point cloud fragment {$P_t$, $P_{t+1}$} as the current point cloud fragment. In this case, the previous point cloud fragment is {$P_{t-1}$, $P_t$}. The next iteration includes the following steps (5) to (7).

In step (5), the current point cloud fragment is {$P_t$, $P_{t+1}$}, the ego-motion $m_{t+1}^{ego}$ of the local device is determined, and the hybrid-time position map $D_{t+1}$ and the motion field $M_{t+1}$ of the current point cloud fragment are determined based on the backbone network.

In step (6), the first tracked position map $T'_t$ obtained in the previous iteration is updated based on the ego-motion $m_{t+1}^{ego}$, so as to generate the temporary tracked position map $T''_{t+1}$.

In step (7), the hybrid-time position map $D_{t+1}$ and the temporary tracked position map $T''_{t+1}$ are averaged to obtain the tracked position map $T_{t+1}$ of the current point cloud fragment.

It should be noted that the hybrid-time position map does not include an object identity of each object. Only the tracked position map (including the temporary tracked position map, the first tracked position map, the second tracked position map and the like) includes the object identity of each object. When generating the tracked position map $T_t$, an object identity is generated so as to add to the new born object D. The objects A, B, and C inherit their previous object identities, respectively.

Figure 4:
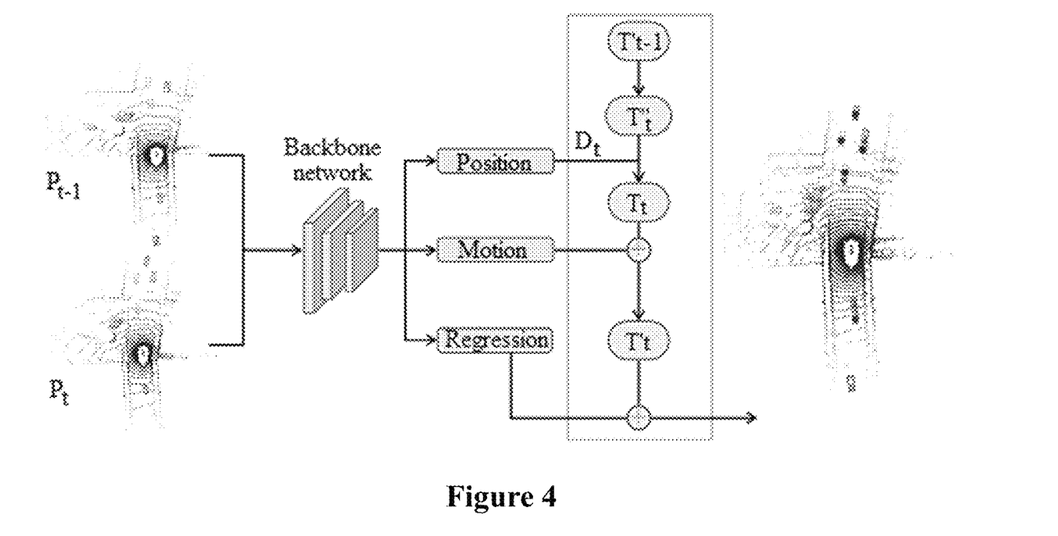
FIG. 4 is a schematic diagram showing an overview of the method for multi-object tracking according to another embodiment of the present disclosure.

The process of the method for multi-object tracking is illustratively explained above, and the processing effect of the method on actual point cloud data is shown in FIG. 4.

As shown in FIG. 4, the backbone network in the embodiment of the present disclosure includes three branches, namely, a position branch, a motion branch, and a regression branch. The position branch is configured to generate a hybrid-time position map. The motion branch is configured to predict the information related to the motion parameters such as the motion field. The regression branch is configured to determine a height, a bounding box size, heading and the like of each object. For the point cloud fragment formed by the point cloud data $P_{t-1}$ and the point cloud data $P_t$, the hybrid-time position map $D_t$ is determined by the position branch. The first tracked position map $T'_{t-1}$ of the previous point cloud fragment is updated based on the ego-motion, to obtain the temporary tracked position map $T''_t$. The hybrid-time position map $D_t$ and the temporary tracked position map $T''_t$ are averaged, to obtain the tracked position map $T_t$ of the current point cloud fragment. Further, the object ID in the temporary tracked position map $T''_t$ is read off, so that the same object in different position maps is represented by the same object ID. The tracked position map $T_t$ is updated based on the motion field determined by the motion branch, so as to obtain the first tracked position map $T'_t$ of the current point cloud fragment. In addition, based on the regression branch, motion offset of each object in the time period of the current point cloud fragment is regressed, so that tracking is implemented based on the first tracked position map, to obtain a result of multi-object tracking.

The currently common method for multi-object tracking includes method respectively based on 3D Kalman filter and CenterPoint. In the embodiment of the present disclosure, open data sets such as nuScenes and Waymo are used to compare the method according to the embodiment of the present disclosure with the above two existing methods. The comparison process involves two backbone networks, which are respectively used to extract pillar and voxel for verification. Moreover, the above two existing methods both involve an association step, and their tracking performance is highly dependent on their respective detection results. Therefore, the results of Pillar/Voxel-Det are compared with the results of Pillar/Voxel-Track combined with detection and tracking. The average multiple object tracking accuracy (AMOTA) serves as a main evaluation index. The comparison results are seen in Table 1 below.

sure is superior to the method based on CenterPoint and the method based on Kalman filter, and has better performance. In addition, hyper-parameters are set in both the method based on CenterPoint and the method based on Kalman filter. However, the method according to the embodiment of the present disclosure completely gets rid of manually set threshold, and has higher robustness.

The method for multi-object tracking according to the embodiment of the present disclosure is described in detail above, and the method is implemented by a corresponding device. The device for multi-object tracking according to the embodiment of the present disclosure is described in detail below.

Figure 5:
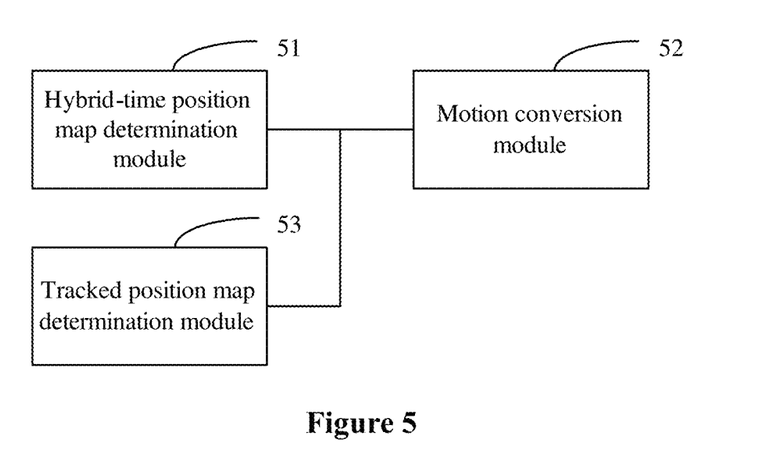
FIG. 5 is a schematic structural diagram showing a device for multi-object tracking according to an embodiment of the present disclosure.

FIG. 5 shows a schematic structural diagram of the method for multi-object tracking according to an embodiment of the present disclosure. As shown in FIG. 5, the device for multi-object tracking includes: a hybrid-time position map determination module 51, a motion conversion module 52 and a tracked position map determination module 53.

The hybrid-time position map determination module 51 is configured to determine a hybrid-time position map of a current point cloud fragment. The hybrid-time position map represents a first appearance position of a valid object in the current point cloud fragment. The valid object is an object in the current point cloud fragment other than a dead object.

The motion conversion module 52 is configured to convert a tracked position map of a previous point cloud fragment into a temporary tracked position map of the current point cloud fragment based on a predicted motion field and ego-motion of the local device. The previous point cloud fragment is a point cloud fragment before the current point cloud fragment. Part of the point cloud data of the previous point cloud fragment is the same as that of the current point cloud fragment. The tracked position map includes position information and an object identity of each object.

The tracked position map determination module 53 is configured to average the hybrid-time position map and the temporary tracked position map of the current point cloud fragment, to generate a tracked position map of the current point cloud fragment. The tracked position map of the current point cloud fragment inherits the object identities in the tracked position map of the previous point cloud fragment.

Based on the foregoing embodiment, the hybrid-time position map determination module 51 is configured to determine the hybrid-time position map of the current point cloud fragment by: converting the current point cloud frag-

TABLE 1

| Method | Detection | Car | Pedestrian | Bike | Motor | Bus | Trail | Truck | Overall |
|---|---|---|---|---|---|---|---|---|---|
| CenterPoint | Pillar-Det | 82.5 | 69.6 | 20.2 | 40.0 | 78.4 | 40.8 | 63.9 | 56.5 |
| Kalman filter | Pillar-Det | 74.7 | 60.3 | 14.0 | 36.0 | 74.9 | 39.1 | 59.5 | 51.2 |
| CenterPoint | Pillar-Track | 79.4 | 64.0 | 24.7 | 53.5 | 78.9 | 46.3 | 59.1 | 58.0 |
| Kalman filter | Pillar-Track | 76.6 | 68.3 | 25.6 | 54.5 | 74.6 | 45.0 | 57.3 | 57.4 |
| This embodiment | Pillar-Track | 84.1 | 68.3 | 27.7 | 57.6 | 76.1 | 46.6 | 59.2 | 60.0 |
| CenterPoint | Voxel-Det | 82.9 | 73.6 | 40.9 | 54.6 | 79.9 | 48.8 | 65.2 | 63.7 |
| Kalman filter | Voxel-Det | 75.7 | 65.7 | 33.5 | 52.2 | 76.7 | 48.2 | 61.1 | 59.0 |
| CenterPoint | Voxel-Track | 81.0 | 70.2 | 48.0 | 60.6 | 79.7 | 50.9 | 61.1 | 64.5 |
| Kalman filter | Voxel-Track | 77.5 | 57.3 | 41.5 | 52.4 | 77.2 | 49.4 | 59.1 | 59.2 |
| This embodiment | Voxel-Track | 84.3 | 71.8 | 45.3 | 64.6 | 80.5 | 54.7 | 61.8 | 66.1 |

As shown in Table 1, in both the backbone network based on pillar and the backbone network based on voxel, the method according to the embodiment of the present discloment into the hybrid-time position map based on a predetermined backbone network. The hybrid-time position map includes confidence of a first appearance position of a valid object in the current point cloud fragment. The position information in the tracked position map represents the confidence of the object at the corresponding position.

Based on the foregoing embodiment, the device further includes a training module.

The training module is configured to, before the hybrid-time position map determination module 51 determines the hybrid-time position map of the current point cloud fragment: generate multiple sample point cloud fragments based on multiple continuous point cloud data, where each sample point cloud fragment has the same part of point cloud data as other sample point cloud fragment adjacent to the sample point cloud fragment; for each of the multiple sample point cloud fragments: determine a first appearance position of each valid object in the sample point cloud fragment, and generate a sample hybrid-time position map including the first appearance position of each valid object in the sample point cloud fragment; train the backbone network based on the multiple sample point cloud fragment and the multiple sample hybrid-time position maps.

Based on the foregoing embodiment, the device further includes a motion field determination module, which is configured to determine a motion field based on the backbone network. The motion field represents motion parameters of an object in the current point cloud fragment.

Based on the foregoing embodiment, the tracked position map determination module 53 is further configured to: generate an object identity and add the generated object identity to a new born object when the new born object shows up in the tracked position map of the current point cloud fragment.

Based on the foregoing embodiment, the motion conversion module 52 is configured to convert a tracked position map of a previous point cloud fragment into a temporary tracked position map of the current point cloud fragment based on a predicted motion field and ego-motion of the local device by: updating the position information of each object in the tracked position map of the previous point cloud fragment based on the motion field of the previous point cloud fragment, to generate a first tracked position map; and updating the position information of each object in the first tracked position map based on the ego-motion corresponding to the current point cloud fragment, to generate the temporary tracked position map.

Alternatively, the motion conversion module 52 is configured to convert a tracked position map of a previous point cloud fragment into a temporary tracked position map of the current point cloud fragment based on a predicted motion field and ego-motion of the local device by: updating the position information of each object in the tracked position map of the previous point cloud fragment based on one of the motion field and the ego-motion corresponding to the current point cloud fragment to generate a second tracked position map; and updating the position information of each object in the second tracked position map based on the other of the motion field and the ego-motion corresponding to the current point cloud fragment, to generate the temporary tracked position map.

Based on the foregoing embodiment, the device further includes a tracking module, which is configured to: perform multi-object tracking based on the tracked position map of the current point cloud fragment; or perform multi-object tracking based on the first tracked position map or the second tracked position map.

Based on the foregoing embodiment, the tracked position map determination module 53 is configured to average the hybrid-time position map and the temporary tracked position map of the current point cloud fragment, to generate a tracked position map of the current point cloud fragment by: performing averaging processing on the hybrid-time position map and the temporary tracked position map of the current point cloud fragment, performing non-maximum suppression processing on the result of the averaging processing, to generate the tracked position map of the current point cloud fragment.

Based on the foregoing embodiment, the first appearance position of the valid object is a first appearance position of a center of the valid object. The position information of an object is position information of a center of the object.

Based on the foregoing embodiment, point cloud data of a last frame of the previous point cloud fragment is the same as point cloud data of a first frame of the current point cloud fragment.

An electronic device is further provided according to an embodiment of the present disclosure. The electronic device includes a bus, a transceiver, a memory, a processor, and a computer program stored in the memory and executed by the processor. The transceiver, the memory and the processor are connected to each other via the bus. The computer program, when executed by the processor, implements the method for multi-object tracking, and has the same technical effects, which are not described here in order to avoid repetition.

Figure 6:
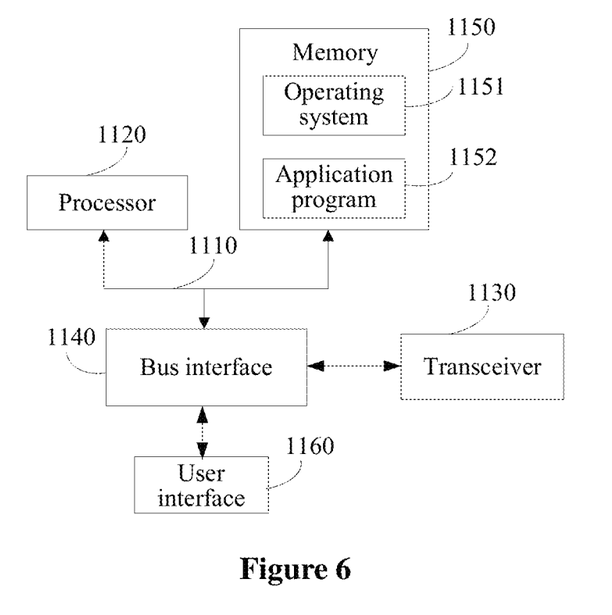
FIG. 6 is a schematic structural diagram showing an electronic device for performing the method for multi-object tracking according to an embodiment of the present disclosure.

Specifically, referring to FIG. 6, an electronic device is further provided according to an embodiment of the present disclosure, wherein the electronic device may be the aforementioned local device 10 or a part of the local device 10, which can obtain the point cloud data collected by the LiDAR 20. The electronic device includes a bus 1110, a processor 1120, a transceiver 1130, a bus interface 1140, a memory 1150, and a user interface 1160.

In an embodiment of the present disclosure, the electronic device further includes a computer program stored in the memory 1150 and capable of running on the processor 1120. The computer program, when executed by the processor 1120, implements the method for multi-object tracking.

The transceiver 1130 is configured to receive and transmit data under the control of the processor 1120.

In the embodiment of the present disclosure, a bus structure (represented by the bus 1110) includes any number of interconnected buses and bridges. The bus 1110 connects various circuits including one or more processors represented by the processor 1120 and a memory represented by the memory 1150 together.

The bus 1110 represents one or more of any one of several types of bus structures, including a memory bus and a memory controller, a peripheral bus, an accelerated graphic port (AGP), a processor or a local bus using any bus structure among various bus architectures. For illustration rather than limitation, such architectures include: an industry standard architecture (ISA) bus, a micro channel architecture (MCA) bus, an extended ISA (EISA) bus, a video electronics standard association (VESA), and a peripheral component interconnect (PCI) bus.

The processor 1120 may be an integrated circuit chip with signal processing capabilities. In implementation, each step of the foregoing method embodiment may be completed by an integrated logic circuit of hardware or instructions in the form of software in the processor. The processor includes: a general-purpose processor, a central processing unit (CPU), a network processor (NP), a digital signal processor (DSP), an application specific integrated circuit (ASIC), a field programmable gate array (FPGA), a complex programmable logic device (CPLD), a programmable logic array (PLA), a microcontroller unit (MCU) or other programmable logic device, a discrete gate, a transistor logic device, a discrete hardware component. The methods, steps, and logical block diagrams disclosed in the embodiments of the present disclosure can be implemented or performed. For example, the processor may be a single-core processor or a multi-core processor, and the processor may be integrated on a single chip or located on various chips.

The processor 1120 may be a microprocessor or any conventional processor. The steps of the method disclosed in the embodiments of the present disclosure may be directly performed and completed by a hardware decoding processor, or may be performed and completed by a combination of hardware and software modules in the decoding processor. The software module may be located in a readable storage medium known in the art such as a random access memory (RAM), a flash memory, a read-only memory (ROM), a programmable read-only memory (PROM), an erasable programmable read-only memory (EPROM), and a register. The readable storage medium is located in the memory. The processor reads the information in the memory and completes the steps of the above method in combination with its hardware.

The bus 1110 further connects various other circuits such as a peripheral device, a voltage regulator, or a power management circuit, and the bus interface 1140 provides an interface between the bus 1110 and the transceiver 1130, which are well known in the art. Therefore, the bus 1110 and the bus interface 1140 are not further described in the embodiments of the present disclosure.

The transceiver 1130 may including one element or multiple elements, such as multiple receivers and transmitters, and provide a unit for communicating with various other devices on a transmission medium. For example, the transceiver 1130 receives external data from other devices, and sends the data processed by the processor 1120 to other devices. Depending on the nature of the computer system, a user interface 1160 may also be provided, including a touch screen, a physical keyboard, a display, a mouse, a speaker, a microphone, a trackball, a joystick, and a stylus.

It should be understood that, in the embodiment of the present disclosure, the memory 1150 may further include a memory remotely set with respect to the processor 1120. The remotely set memory may be connected to the server through a network. One or more parts of the above-mentioned network may be an ad hoc network, an intranet, an extranet, a virtual private network (VPN), a local area network (LAN), a wireless local area network (WLAN), a wide area network (WAN), a wireless wide area network (WWAN), a metropolitan area network (MAN), the Internet (Internet), a public switched telephone network (PSTN), an plain old telephone service network (POTS), a cellular telephone network, a wireless network, a wireless fidelity (Wi-Fi) network and a combination of two or more of the aforementioned networks. For example, the cellular telephone network and the wireless network each may be a global mobile communications (GSM) system, a code division multiple access (CDMA) system, a global interconnection for microwave access (WiMAX) system, a general packet radio service (GPRS) system, a broadband code division multiple access (WCDMA) system, a long-term evolution (LTE) system, an LTE frequency division duplex (FDD) system, an LTE time division duplex (TDD) system, an advanced long term evolution (LTE-A) system, a universal mobile telecommunications (UMTS) system, an enhanced mobile broadband (eMBB) system, a massive machine type of communication (mMTC) system, a ultra-reliable low latency communications (uRLLC) system and the like.

It should be understood that the memory 1150 in the embodiment of the present disclosure may be a volatile memory or a non-volatile memory, or may include both a volatile memory and a non-volatile memory. The non-volatile memory includes: a read-only memory (ROM), a programmable read-only memory (PROM), ab erasable programmable read-only memory (EPROM), an electrically erasable programmable read-only memory (EEPROM) or a flash memory.

The volatile memory includes: a random access memory (RAM), which serves as an external cache. For illustration rather than limitation, various RAM are available, such as: a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM) and a direct Rambus random access memory (DRRAM).

In the embodiment of the present disclosure, the memory 1150 stores the following elements of an operating system 1151 and an application program 1152: executable modules, data structures, or a subset thereof, or an extension set thereof.

Specifically, the operating system 1151 includes various system programs, such as a framework layer, a core library layer, a driver layer and the like, for implementing various basic services and processing hardware-based tasks. The application program 1152 includes various application programs, such as a media player and a browser, for implementing various application services. A program that implements the method of the embodiments of the present disclosure may be included in the application program 1152. The application program 1152 includes: an applet, an object, a component, logic, a data structure, and other computer system executable instructions that perform specific tasks or implement specific abstract data types.

In addition, a computer-readable storage medium on which a computer program is stored is further provided according to an embodiment of the present disclosure. When the computer program is executed by the processor, each step of the above-mentioned method for multi-object tracking is implemented, and the same technical effects can be achieved. In order to avoid repetition, details are not repeated here.

The computer-readable storage medium includes permanent and non-permanent, removable and non-removable media, and is a tangible device that retains and stores instructions executed by an instruction execution device. The computer-readable storage medium includes: an electronic storage device, a magnetic storage device, an optical storage device, an electromagnetic storage device, a semi-conductor storage device, and any suitable combination of the foregoing. The computer-readable storage medium includes: a phase change memory (PRAM), a static random access memory (SRAM), a dynamic random access memory (DRAM), other types of random access memory (RAM), a read-only memory (ROM), a non-volatile random access memory (NVRAM), an electrically erasable programmable read-only memory (EEPROM), a flash memory or other memories, a compact disc read-only memory (CD-ROM), a digital versatile disc (DVD) or other optical storage device, a magnetic cassette memory, a magnetic tape disk memory or other magnetic storage devices, a memory stick, a mechanical encoding device (such as a punched card or raised structure in a groove on which instructions are recorded) or any other non-transmission medium, and is configured to store information that can be accessed by a computing device. According to the definition in the embodiments of the present disclosure, the computer-readable storage medium does not include temporary signals, such as radio waves or other freely transmitted electromagnetic waves, electromagnetic waves transmitted through waveguides or other transmission media (such as light pulses passing through optical fiber cables) or electrical signals transmitted through wires.

In the embodiments of the present disclosure, it should be understood that the disclosed device, electronic device, and method may be implemented in other ways. For example, the device embodiments described above are only illustrative. For example, the division of the modules or units is only a logical function division, and there may be other division manners in actual implementation. For example, multiple units or components may be combined or integrated into another system, or some features may be omitted or not implemented. In addition, the shown or discussed mutual coupling or direct coupling or communication connection may be indirect coupling or communication connection through some interfaces, devices or units, and may also be electrical, mechanical or other forms of connection.

The units described as separate components may or may not be physically separate. Components shown as units may or may not be a physical unit, that is, may be located in one position or distributed on multiple network units. Some or all of the units may be selected according to actual needs to solve the problems to be solved by the solutions of the embodiments of the present disclosure.

In addition, the functional units in the various embodiments of the present disclosure may be integrated into one processing unit, or each unit may separate physically, or two or more units may be integrated into one unit. The above-mentioned integrated unit may be implemented in the form of hardware or software functional unit.

If the integrated unit is implemented in the form of a software functional unit and sold or used as an independent product, the integrated unit may be stored in a computer-readable storage medium. Based on this understanding, the technical solutions of the embodiments of the present disclosure are essentially or a part that contributes to the conventional technology, or all or part of the technical solutions may be embodied in the form of a computer software product. The computer software product is stored in a storage medium and includes a number of instructions so that a computer device (such as a personal computer, a server, a data center or other network devices) execute all or part of the steps of the method described in the embodiments of the present disclosure. The aforementioned storage medium includes various media capable of storing program codes as listed above.

In the description of the embodiments of the present disclosure, those skilled in the art should understand that the embodiments of the present disclosure may be implemented as a method, an apparatus, an electronic device, and a computer-readable storage medium. Therefore, the embodiments of the present disclosure may be specifically implemented in the following forms: complete hardware, complete software (including firmware, resident software, microcode and the like), and a combination of hardware and software. In addition, in some embodiments, the embodiments of the present disclosure may also be implemented in the form of a computer program product in one or more computer-readable storage media, and the computer-readable storage medium includes computer program codes.

The aforementioned computer-readable storage medium may adopt any combination of one or more computer-readable storage media. The computer-readable storage medium includes: an electrical, magnetic, optical, electromagnetic, infrared, or semiconductor system, device, or device, or any combination of the above. More specific examples of computer-readable storage media include: a portable computer disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device or any combination of the above. In the embodiments of the present disclosure, the computer-readable storage medium may be any tangible medium that includes or stores a program, and the program may be executed by an instruction execution system, apparatus, or device, or in combination therewith.

The computer program code included in the above-mentioned computer-readable storage medium may be transmitted by any suitable medium, including: a wireless medium, a wired medium, an optical cable, radio frequency (RF), or any suitable combination of the above.

The computer program codes for implementing the operations in the embodiments of the present disclosure may be written in the form of assembly instructions, instruction set architecture (ISA) instructions, machine instructions, machine-related instructions, microcode, firmware instructions, state setting data, integrated circuit configuration data, or in one or more programming languages or a combination thereof. The programming language includes object-oriented programming languages, such as Java, Smalltalk, and C++, as well as conventional procedural programming languages, such as C language or similar programming languages. The computer program codes may be executed entirely on the user computer, partly on the user computer, executed as an independent software package, partly on the user computer and partly on a remote computer, and completely executed on a remote computer or server. In the case of a remote computer, the remote computer can be connected to a user' computer or an external computer through any kind of network, including: a local area network (LAN) or a wide area network (WAN).

The embodiments of the present disclosure describe the provided methods, devices, and electronic equipment through flowcharts and/or block diagrams.

It should be understood that each block in the flowcharts and/or block diagrams and the combination of blocks in the flowcharts and/or block diagrams may be implemented by computer readable program instructions. These computer-readable program instructions may be provided to the processor of a general-purpose computer, a special-purpose computer, or other programmable data processing device, to produce a machine. These computer-readable program instructions are executed by a computer or other programmable data processing device to generate a device that implements the functions/operations specified by the blocks in the flowcharts and/or block diagrams.

These computer-readable program instructions may also be stored in a computer-readable storage medium that can make a computer or other programmable data processing device work in a specific manner. In this way, the instructions stored in the computer-readable storage medium produce an instruction device product that includes the functions/operations specified in the blocks in the flowcharts and/or block diagrams.

Alternatively, the computer-readable program instructions are loaded onto a computer, other programmable data processing device, or other device, so that a series of operation steps are executed on the computer, other programmable data processing device, or other device to produce a computer-implemented process, so that the instructions executed on the computer or other programmable data processing device can provide a process for implementing the functions/operations specified by the blocks in the flowcharts and/or block diagrams.

Specific implementations of the embodiments of the present disclosure are described above, and the scope of protection of the embodiments of the present disclosure is not limited thereto. Any person skilled in the art can easily conceive of changes or substitutions within the technical scope disclosed in the embodiments of the present disclosure, and these changes or substitutions should be covered by the scope of protection of the embodiments of the present disclosure. Therefore, the protection scope of the embodiments of the present disclosure should be subject to the protection scope of the claims.

The invention claimed is:

1. A method for multi-object tracking, comprising:
determining a hybrid-time position map of a current point cloud fragment, wherein the hybrid-time position map represents a first appearance position of a valid object in the current point cloud fragment, and the valid object is an object other than a dead object in the current point cloud fragment;
converting a tracked position map of a previous point cloud fragment into a temporary tracked position map of the current point cloud fragment based on a predicted motion field and an ego-motion of a local device, wherein the previous point cloud fragment is a point cloud fragment before the current point cloud fragment, part of point cloud data of the previous point cloud fragment is the same as that of the current point cloud fragment, and the tracked position map comprises position information and an object identity of each object; and
averaging the hybrid-time position map and the temporary tracked position map of the current point cloud fragment, to generate a tracked position map of the current point cloud fragment, wherein the tracked position map of the current point cloud fragment inherits an object identity in the tracked position map of the previous point cloud fragment.

2. The method according to claim 1, wherein the determining a hybrid-time position map of a current point cloud fragment comprises:
converting the current point cloud fragment into the hybrid-time position map based on a predetermined backbone network, wherein the hybrid-time position map comprises confidence of the first appearance position of the valid object in the current point cloud fragment, and the position information in the tracked position map represents confidence of the object at a corresponding position.

3. The method according to claim 2, wherein before the determining a hybrid-time position map of a current point cloud fragment, the method further comprises:
generating a plurality of sample point cloud fragments based on a plurality of continuous point cloud data, wherein each of the plurality of sample point cloud fragments has the same part of point cloud data as other sample point cloud fragment adjacent to the sample point cloud fragment;
for each of the plurality of sample point cloud fragments: determining a first appearance position of each valid object in the sample point cloud fragment, and generating a sample hybrid-time position map comprising the first appearance position of each valid object in the sample point cloud fragment; and
training the backbone network based on the plurality of sample point cloud fragments and the plurality of sample hybrid-time position maps.

4. The method according to claim 2, further comprising:
determining the motion field based on the backbone network, wherein the motion field represents motion parameters of an object in the current point cloud fragment.

5. The method according to claim 1, further comprising:
generating an object identity and adding the generated object identity to a new born object when the new born object shows up in the tracked position map of the current point cloud fragment.

6. The method according to claim 1, wherein the converting a tracked position map of a previous point cloud fragment into a temporary tracked position map of the current point cloud fragment based on a predicted motion field and an ego-motion of a local device comprises:
updating the position information of each object in the tracked position map of the previous point cloud fragment based on a motion field of the previous point cloud fragment, to generate a first tracked position map, and updating the position information of each object in the first tracked position map based on the ego-motion corresponding to the current point cloud fragment, to generate the temporary tracked position map; or
updating the position information of each object in the tracked position map of the previous point cloud fragment based on one of the motion field and the ego-motion corresponding to the current point cloud fragment, to generate a second tracked position map, and updating the position information of each object in the second tracked position map based on the other of the motion field and the ego-motion corresponding to the current point cloud fragment, to generate the temporary tracked position map.

7. The method according to claim 6, further comprising:
performing multi-object tracking based on the tracked position map of the current point cloud fragment; or
performing multi-object tracking based on the first tracked position map or the second tracked position map.

8. The method according to claim 6, further comprising outputting for display to a user on a user interface one or more of the first tracked position map and the second tracked position map.

9. The method according to claim 1, wherein the averaging the hybrid-time position map and the temporary tracked position map of the current point cloud fragment, to generate a tracked position map of the current point cloud fragment comprises:
performing averaging processing on the hybrid-time position map and the temporary tracked position map of the current point cloud fragment, performing non-maximum suppression processing on a result of the averaging processing, to generate the tracked position map of the current point cloud fragment.

10. The method according to claim 1, wherein the first appearance position of the valid object is a first appearance position of a center of the valid object, and the position information of an object is position information of a center of the object.

11. The method according to claim 1, wherein point cloud data of a last frame of the previous point cloud fragment is the same as point cloud data of a first frame of the current point cloud fragment.

12. The method according to claim 1, further comprising collecting point cloud data using a LiDAR.

13. The method according to claim 1, further comprising receiving point cloud data collected by a LiDAR.

14. The method according to claim 1, further comprising:
collecting multiple frames of point cloud data using a LiDAR; and
selecting in sequence the multiple frames of point cloud data to form the current point cloud fragment.

15. A device for multi-object tracking, comprising:
a hybrid-time position map determination module configured to determine a hybrid-time position map of a current point cloud fragment, wherein the hybrid-time position map represents a first appearance position of a valid object in the current point cloud fragment, and the valid object is an object other than a dead object in the current point cloud fragment;
a motion conversion module configured to convert a tracked position map of a previous point cloud fragment into a temporary tracked position map of the current point cloud fragment based on a predicted motion field and ego-motion of a local device, wherein the previous point cloud fragment is a point cloud fragment before the current point cloud fragment, part of point cloud data of the previous point cloud fragment is the same as that of the current point cloud fragment, and the tracked position map comprises position information and an object identity of each object; and
a tracked position map determination module configured to average the hybrid-time position map and the temporary tracked position map of the current point cloud fragment, to generate a tracked position map of the current point cloud fragment, wherein the tracked position map of the current point cloud fragment inherits an object identity in the tracked position map of the previous point cloud fragment.

16. The method according to claim 1, further comprising outputting for display to a user on a user interface the tracked position map.

17. The device according to claim 15, further comprising a LiDAR configured to collect point cloud data.

18. The device according to claim 15, further comprising a user interface configured to display to a user the tracked position map.

19. An electronic device, comprising:
a bus;
a transceiver;
a memory storing computer-readable instructions; and;
a processor configured to execute the computer-readable instructions; and wherein
the transceiver, the memory, and the processor are connected to each other via the bus, and
wherein the computer-readable instructions include:
determining a hybrid-time position map of a current point cloud fragment, wherein the hybrid-time position map represents a first appearance position of a valid object in the current point cloud fragment, and the valid object is an object other than a dead object in the current point cloud fragment;
converting a tracked position map of a previous point cloud fragment into a temporary tracked position map of the current point cloud fragment based on a predicted motion field and an ego-motion of a local device, wherein the previous point cloud fragment is a point cloud fragment before the current point cloud fragment, part of point cloud data of the previous point cloud fragment is the same as that of the current point cloud fragment, and the tracked position map comprises position information and an object identity of each object; and
averaging the hybrid-time position map and the temporary tracked position map of the current point cloud fragment, to generate a tracked position map of the current point cloud fragment, wherein the tracked position map of the current point cloud fragment inherits an object identity in the tracked position map of the previous point cloud fragment.

20. A non-transitory computer-readable storage medium, wherein a computer program is stored in the non-transitory computer-readable storage medium, wherein the computer program, when executed by a processor, performs:
determining a hybrid-time position map of a current point cloud fragment, wherein the hybrid-time position map represents a first appearance position of a valid object in the current point cloud fragment, and the valid object is an object other than a dead object in the current point cloud fragment;
converting a tracked position map of a previous point cloud fragment into a temporary tracked position map of the current point cloud fragment based on a predicted motion field and an ego-motion of a local device, wherein the previous point cloud fragment is a point cloud fragment before the current point cloud fragment, part of point cloud data of the previous point cloud fragment is the same as that of the current point cloud fragment, and the tracked position map comprises position information and an object identity of each object; and
averaging the hybrid-time position map and the temporary tracked position map of the current point cloud fragment, to generate a tracked position map of the current point cloud fragment, wherein the tracked position map of the current point cloud fragment inherits an object identity in the tracked position map of the previous point cloud fragment.

* * * * *